MAGNETIC MEMORY CORE

Original Filed Feb. 10, 1960 5 Sheets-Sheet 1

INVENTOR.
ROBERT E. McMAHON
BY
AGENT

INVENTOR.
ROBERT E. McMAHON
BY Edward D. Thomas
AGENT

INVENTOR.
ROBERT E. McMAHON
BY
Edward D. Thomas
AGENT

INVENTOR.
ROBERT E. McMAHON
BY Edward D. Thomas
AGENT

INVENTOR.
ROBERT E. McMAHON
BY
Edward D. Thomas
AGENT

United States Patent Office 3,281,802
Patented Oct. 25, 1966

3,281,802
MAGNETIC MEMORY CORE

Robert E. McMahon, Dunstable, Mass., assignor to Massachusetts Institute of Technology, Cambridge, Mass., a corporation of Massachusetts Continuation of application Ser. No. 7,862, Feb. 10, 1960. This application Nov. 27, 1964, Ser. No. 415,567
5 Claims. (Cl. 340—174)

This application is a continuation of application Serial No. 7,862, filed February 10, 1960, and now abandoned, for Magnetic Memory Core.

This invention concerns a storage and selection system for digital information which uses coincident current energization for storage of information in magnetic cores which are arranged in multi-coordinate groupings.

Existing storage and selection systems for digital information which use rectangular hysteresis loop magnetic material for storage are generally of the coincident current selection type. That is, a particular core of a planar array of cores in rows and columns is energized by the superposition of a current in a wire energizing the cores in a given row, and a current on a wire energizing the cores in a give column. Each of the currents are equal in amplitude and of insufficient magnitude individually to cause a substantial permanent change of flux in any core. However, when time superimposed, the sum of the currents is sufficient to cause saturation of flux in the core located at the intersection of the row and column. A more detailed description of this conventional type of core memory may be found in Patent No. 2,736,880 to Jay W. Forrester.

Systems of the type described above have been developed to provide high speed access to very large stores of information. The speed of access to successive words of a memory is limited to a large extent by the switching time (time required for flux reversal) of the magnetic cores. Since the switching time is dependent upon the composition and geometry of the rectangular loop magnetic material, much effort has been expended to reduce the switching time through control of these parameters. Development efforts have produced a ferrite magnetic material which has a switching time in the order of one microsecond and good rectangular loop characteristics. Further reduction of switching time through variation in geometry and composition appears improbable. The total cycle time for a read-write operation is approximately six microseconds for a conventional coincident current memory.

The present invention allows the use of coincident current type memories without the speed of operation limitation imposed by the switching time of magnetic cores when conventionally operated. More specifically, a coincident current memory is described which increases speed of operation by switching the flux in only a portion of the core in less than the conventional switching time by the action of the magnetizing force resulting from the time coincidence of a short time duration, large amplitude current pulse (called an "impulse" of current) and a relatively long time duration, low amplitude current pulse.

Accordingly, the principal object of this invention is to provide a system which substantially increases the speed of operation of coincident current type magnetic core memories.

Reliability of a magnetic core memory is equally as important as speed of operation since both are necessary to a useful system. Since reliability is determined in part by the ability of read-out sensing apparatus to readily determine whether a binary "1" or "0" had been stored in a particular magnetic core, a memory system which provides large "1" to "0" (signal-to-noise) ratios, is desirable.

It is a further object of this invention, therefore, to provide a memory system having higher signal-to-noise ratios than memory systems heretofore available.

Attempts to increase speed of operation of a magnetic core memory in existing systems are principally directed to minimizing the time taken by operations other than switching the core. As a consequence of the resulting high duty cycle, the heat energy produced by the losses in the core because of flux switching cause a temperature rise in the cores with consequent change in magnetic properties.

An object of this invention is to provide a memory system which dissipates less power at higher speeds than existing systems.

Another object of the invention is to provide a novel and effective memory system having non-destructive read out capabilities.

Another object of this invention is to provide a memory element which will allow the information stored in said element to be read out more than once before the information is destroyed.

Still another object of this invention is to provide a magnetic storage element which will act as an accumulator of pulses applied thereto.

These and other objects are achieved, according to a feature of the invention, by applying to a magnetic core, a current pulse of short duration and of large amplitude controlled to produce flux reversal in only a portion of the magnetic core.

A typical embodiment of magnetic elements operating in accordance with the invention is a coincident current magnetic storage system. The storage function is accomplished by only partially changing the flux state of the core, i.e., partial switching. Partial switching of a core is accomplished by time coincidence of the impulse of current and a pulse current of smaller amplitude and longer time duration.

Another embodiment of the invention involves a magnetic element for a multiple-pulse read out circuit whose operation depends upon the application of a series of impulses of current to produce a corresponding series of output pulses until core saturation is reached.

Another embodiment of the invention uses a core having one or more sense windings which functions as an accumulator of impulse currents.

Still another embodiment which features partial switching of a core by an impulse of current is a magnetic circuit which allows non-destructive sensing of the digital information contained in the magnetic state of the core.

Other objects and features of the invention will be pointed out in the following description and claims and illustrated in the accompanying drawings, in which:

The embodiments of this invention are based upon a utilization of the magnetic properties of a ferrite core having rectangular hysteresis loop characteristics when the core is subject to magnetizing forces of the particular kind used in the embodiments. More specifically, magnetic core circuits have been built in which the magnetizing force is produced by a current of large amplitude and short time duration, an impulse of current.

Figure 1:
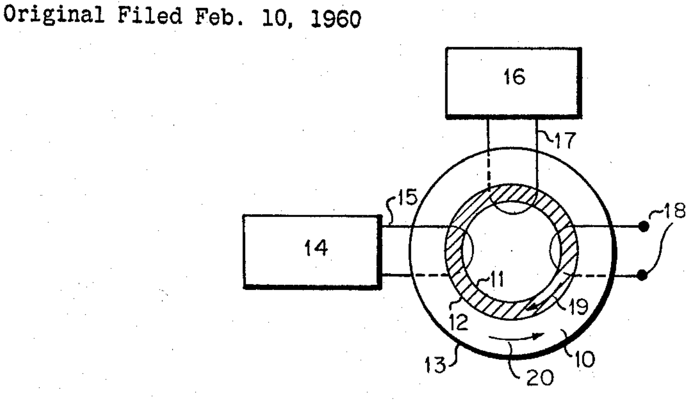
FIGURE 1 is a magnetic core showing a region of reversed magnetization.

FIGURE 1 shows a magnetic core 10 with its original flux state shown by direction arrow 20. If a pulse of current is produced in winding 15 by pulse generator 14, so as to produce a magnetomotive force greater than the coercive force in the direction shown by direction arrow 19, the flux in core 10 will reverse from direction 20 to direction 19 beginning at the inner surface 11 of the core and progressing at a finite rate to the outer surface 13. If the pulse current from generator 14 is terminated before the flux has reached the outer surface 13, there will be an annular region 12 shown cross hatched where the flux is in the direction 19. The flux in the remainder of the core 10 will be in the original direction 20. The embodiments of the present invention employ circuits which are fundamentally dependent upon this "partial switching" of flux direction and the magnetic characteristics peculiar thereto.

Experiments have shown that the coercive force of the magnetic material increases with decrease of the applied current pulse width. The amplitude of a narrow pulse of current produces a magnetizing force much larger than the normal coercive force of the material without switching a noticeable percentage of the flux. The normal (quasi-static) coercive force is defined as that value of coercive force obtained when the magnetizing force is produced by a slowly varying or a direct current. At very narrow widths of pulse current only reversible (nonpermanent) flux changes take place, even with amplitudes several times greater than the normal coercive force.

One possible embodiment of this invention is in the from of a magnetic core memory element. The use of a magnetic core for a memory element is not new, in particular, the use of a coincidence current technique for energizing a particular core in a planar array is well known. However, these known memory systems are being operated with slower speeds, less reliability and higher power dissipation than is possible with the mode of operation of the present invention. These deficiencies exist in spite of efforts to reduce core material switching time and circuitry time delay because of a failure to operate the cores in accordance with the method of the present invention.

Figure 2:
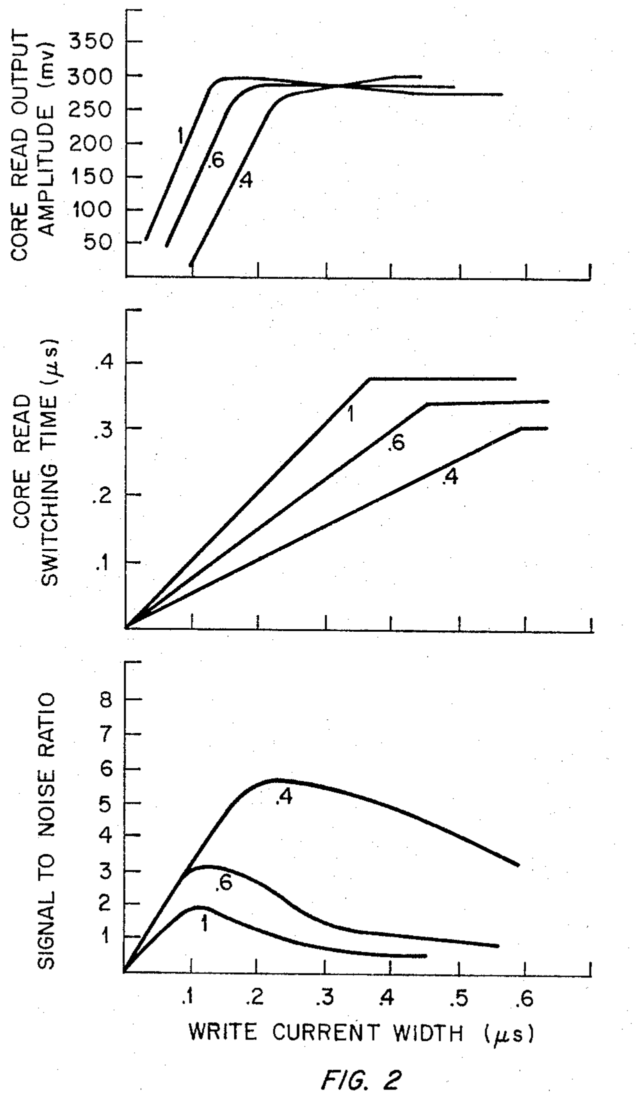
FIGURE 2 shows curves which illustrate the magnetic core characteristics as a function of "write" current width.

In order to illustrate the principle of the present invention, certain electrical characteristics of the partially switched magnetic core 10 of FIGURE 1 are shown in FIGURE 2. Partial switching is accomplished by the time coincidence of two aiding magnetizing forces, one magnetizing force being produced by a short time duration, high amplitude pulse of current in winding 15 from generator 14 which is designated as the "write" current, the other magnetizing force being produced by a wider, low amplitude current in winding 17 from generator 16 called the "exciter" current. It is understood that the time coincidence is obtained by those timing techniques well known to the art which regardless of refinements in detail ultimately require some form of timing pulse generator 42. The partially switched core 10 is subsequently returned to a state of flux saturation in the direction 20 by a current in winding 15 from generator 14 called the "read" current. The read current is similar in amplitude and time duration to the write current but flows in the opposite direction through winding 15. The characteristics of the output voltage at terminals 18 are plotted as a function of write current width in FIGURE 2. By way of definition, the "core read switching time" of FIGURE 2 is the time duration of the output pulse at terminals 18 produced by the read current measured between the 10% peak amplitude values. The signal-to-noise ratio is defined as the ratio of the voltage at terminals 18 produced by the read current after partial switching by the time coincidence of the write and excite currents and the voltage produced by the read current after application of the write current alone.

The pulse characteristics of FIGURE 2 are obtained by applying a write current of 0.4, 0.6, and 1.0 ampere magnitude and variable width, an exciter current of 250 ma. at 0.8 μsec., and a read current of 1 ampere at 0.4 μsec. to a ferrite core ($Mg_{0.81}Mn_{0.47}Fe_{1.71}O_4$) of 50 mils outside diameter, 30 mils inside diameter and 15 mils thickness. The exciter current when present is applied in time coincidence with the write current and need only be slightly wider than the write current. The exciter current value produces a magnetizing force approximately one-half the value of the coercive force. The coincidence of a write and exciter current causes partial switching during the time the write current is applied. However, the absence of the exciter current drastically reduces the value of flux switched. The amount of the reduction determines the signal-to-noise ratio as previously defined.

As an example, reference to FIGURE 2 shows that using a write current value of approximately 0.6 amp, 0.15 μsec. results in a signal-to-noise ratio of nearly three when the exciter current is about 250 ma. (It may be noted that the signal-to-noise ratio increases to approximately 4.5 if the read current is increased to 1.5 amperes.) The exciter current need only be slightly wider than the write current but was maintained at a constant width of 0.8 μsec. for convenience in securing the data of FIGURE 2. The corresponding read voltage at terminals 18 was 250 mv. with a switching time as previously defined of only slightly over 0.1 μsec. Therefore, the read current could be reduced to this width (approximately 0.1 μsec.) without affecting the output voltage. Thus, the total read-write cycle time is only slightly over 0.25 μsec.

The data represented by the curves of FIGURE 2 and other experimental data indicate that usable signal-to-noise ratios (minimum of approximately three to one) may be obtained with write current pulse amplitudes of 400 ma. to one ampere approximately, and about 0.1 to 0.4 μsec., exciter current pulse amplitudes of 100 ma. to 250 ma., and read current pulse amplitudes of one to two amperes.

The maximum amplitude and the minimum time duration of the write current pulse have not been clearly defined by experiments. The principal difficulty being the generation of high amplitude current pulses with rise times that are negligible compared to the total pulse width. Present experimental circuitry has a rise time of approximately 40 millimicroseconds for a 100 millimicrosecond pulse of 1 ampere magnitude. The ultimate limitation on the write current occurs when, acting in concert with the excite current, the flux produced thereby is reversible, i.e., the flux in the core will revert to its former state after removal of the magnetizing force.

The exciter current need be only slightly greater in time duration than the write current if jitter and time delays are negligible. The lower values of exciter current (approximately 100 ma.) result in larger maximum signal-to-noise ratios but at a sacrifice in speed (wider write pulse current required at optimum).

The larger values of read current pulse amplitude appear preferable since higher signal-to-noise ratios and reduced switching time result. The minimum amplitude of the read current is determined by the requirement that the read current switch all the flux in the core to saturation during the time it is applied.

Since the write current has short time duration and high amplitude (also the read current), the above described technique of flux switching in a portion of a magnetic core is termed the "impulse mode" of partial core switching or alternately "partial switching." It is to be understood that these terms are used interchangeably.

Figure 3:
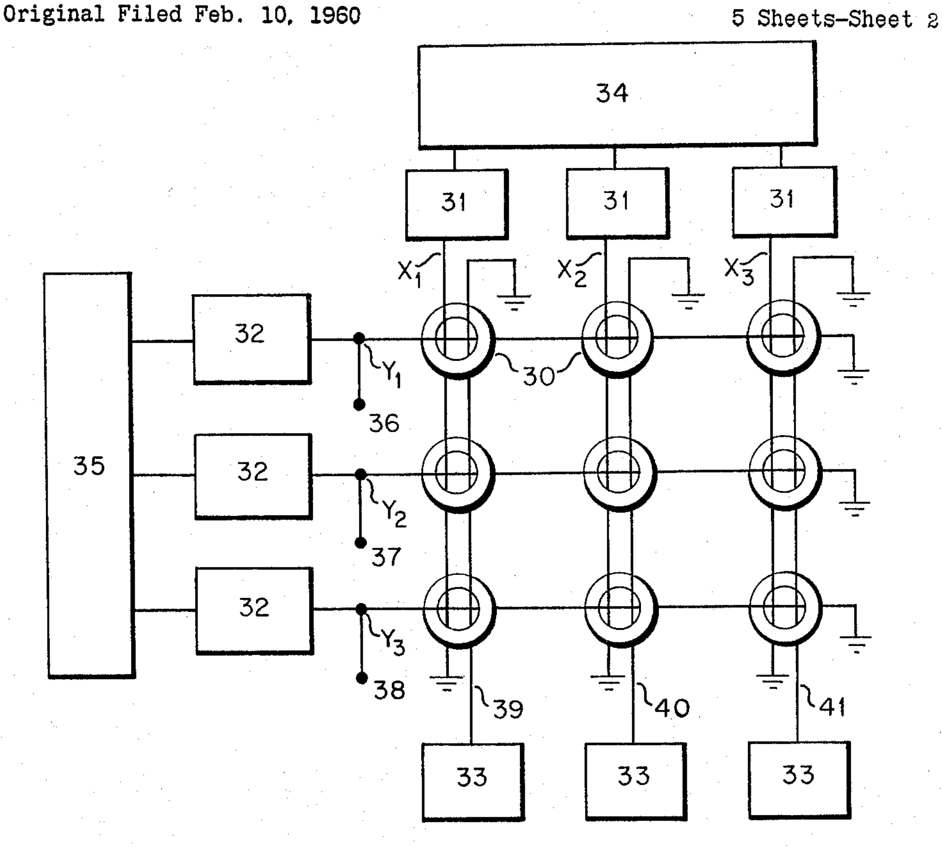
FIGURE 3 is a linear selection (word organized) memory system which illustrates a circuit for practicing the present invention.

A preferred embodiment of magnetic cores in a memory system which uses partial switching in accordance with the invention is shown in FIGURE 3. The system of FIGURE 3 is known to those skilled in the art as a "linear selection" or "word organized" memory. The magnetic cores 30 are arranged in rows and columns, the "words" of the memory being the rows and the binary digits of words being the columns. FIGURE 3 shows a 3 x 3 array of cores for convenience of illustration only, an actual memory system is not limited to such few cores. As an example, but not as a limitation, a memory consisting of 1040 words of 80 bit length has been successfully operated with a read-write cycle time of 500 millimicroseconds.

To understand the operation of the embodiment of the invention shown in FIGURE 3, assume that a binary word 101 is to be written into the row of cores threaded by wire $Y_2$. Any word that may have been in this row of cores is first erased by a read current pulse on wire $Y_2$ from pulse generator 32 connected thereto. All these cores then may be said to be in the "0" state. Pulse generator 32 connected to wire $Y_2$ is actuated by a signal from the word selection matrix 35. A write current pulse (opposite in direction to the read pulse) is generated by the same pulse generator 32 at the termination of the read pulse. The digit pulse generators 31 generate the excite pulse currents on lines $X_1$, $X_2$ and $X_3$, each of which thread one column of cores, in accordance with control signals from the digit selection matrix 34. Since the digit information is 101, only those two pulse generators 31 which are connected to wires $X_1$ and $X_3$ are energized by a signal from matrix 34. Matrices 34 and 35 are of the type familiar to those skilled in the art and do not constitute part of the invention. It is necessary that the excite current pulses on wires $X_1$ and $X_3$ and the write current pulse on wire $Y_2$ occur in time coincidence in order get partial switching on cores at the intersection of wires $X_1$, $Y_2$ and $X_3$, $Y_2$ in accordance with the invention. The time coincidence is produced by causing the signal from word selection matrix 35 and digit selection matrix 34 to be synchronized by timing pulse generator 42. The core at intersection $X_2$, $Y_2$ will have a magnetizing force produced by the write current only. Thus, the word 101 is written into the row of cores threaded by wire $Y_2$ as represented by their degree of magnetization. Since wires 39, 40 and 41 which thread the digit cores supply pulse signals to their respective sense amplifiers 33 upon the application of a read pulse current by a selected pulse amplifier 32.

Circuit diagrams showing the details of the digit (excite) pulse current generator 31, the word (write) pulse current generator 32 and the sense amplifier 33 appear in a report of the work done in furtherance of this invention in the Wescon Convention Record, Part 4, August 1959, pages 3 through 15, by V. J. Sferrino.

The current amplitudes and widths used in the system of FIGURE 3 are in the general range of the values indicated as desirable in the discussion of FIGURE 2. The amplitude of the exciter current must be sufficiently small so that no cumulative flux change in a core threaded thereby occurs because of the repeated application of said exciter current as would occur in a linear selection memory system. There is no accumulation of flux in cores because of repeated applications of a write current threading said cores because each write current is preceded by a read current which returns the core to a "0" state of saturation.

A coincident current memory system of the conventional type which uses coincidence techniques for reading information out of magnetic cores as well as writing into said cores can be adapted by those skilled in the art to operate with the impulse current mode of switching in accordance with the invention. The operation of such a system would require the use of the usual inhibit current which would be made equal to the excite current. There would be an additional requirement that the write current and the read current produce no cumulative flux change in the cores which are threaded by the wires carrying said currents. This requirement of no cumulative flux change is satisfied in the conventional coincident current memory system by limiting the coordinate currents to a value which produces a magnetizing force of approximately one-half the coercive force. When impulse current switching is used, the requirement may be restated by saying that the read and write current pulses acting alone (not aided by the excite current) must produce a reversible flux change in the cores upon which they act. It can be readily appreciated that the read and write current pulses must be much more accurately controlled to achieve this result than when the linear selection memory system is used with impulse current switching. Linear selection is also a preferred embodiment of the invention since the read current may be much greater than in conventional coincident current memory systems. Faster switching and greater signal-to-noise ratio result therefrom.

Figure 4:
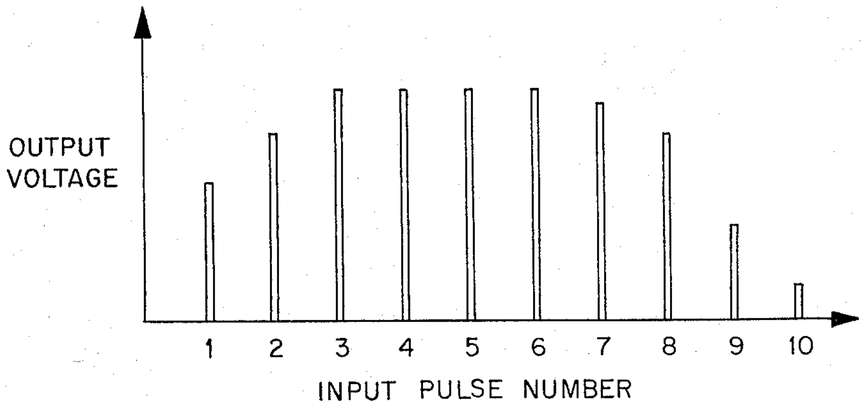
FIGURE 4 illustrates the train of output pulses obtained with multiple read out operation.

Another embodiment of the invention called a multiple-pulse read out circuit may be illustrated by referring to FIGURES 1 and 4. Pulse generator 16 produces a current in winding 17 which saturates core 10 with flux in direction 20. Pulse generator 14 produces a succession of impulses of current in winding 15, each impulse capable of producing a nonreversible flux change in direction 19 in radially expanding annular regions such as region 12. Each time the amount of flux in direction 19 increases, there is a corresponding pulse voltage at terminals 18. FIGURE 4 shows the approximate manner in which the core output voltage at terminals 18 varies with successive applications of typical pulse currents of 800 ma. at 0.06 μsec. in winding 15 from generator 14. The voltage output at terminals 18 is relatively constant for about eight pulses after which saturation in the direction 19 occurs and the output voltage drops to a comparatively small value.

The above described mode of operation of FIGURE 1 can be applied to the linear selection system of FIGURE 3. The write current pulse is adjusted to an amplitude and time duration which when applied in time coincidence with an exciter current pulse will produce flux reversal over a substantial portion of the core. For instance, a typical value of write current would be 0.6 ampere at 0.2 μsec. and an exciter current of 250 ma. Time coincidence of these two currents will produce flux reversal over approximately one half of the core. Subsequent application of five or six typical read current pulses at 800 ma. at 0.06 μsec. would produce three or four equal amplitude output pulses on the sense wire. An excess number of read pulses to useful output pulses would insure that the core was well into saturation at the end of the read time interval, a situation which improves the signal-to-noise ratio of a subsequent read-write cycle of operation. The pulse generators 32 of FIGURE 3 could easily be constructed by one skilled in the art to produce a fixed number of equally spaced read current pulses when so instructed by selection matrix 35.

Multipulse output operation can also be applied to a conventional coincident current read-write memory system by applying the methods described previously.

Figure 9:
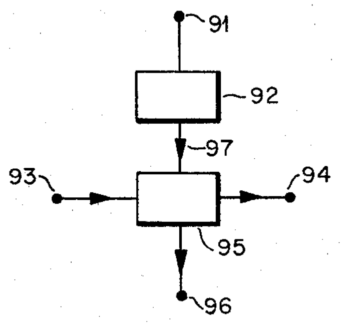
FIGURE 9 is a sensing circuit for multipulse read out-put operation.

Multiple-pulse read output operation is highly advantageous in a memory system where the read output voltage pulse must be detected in a noisy background in which the noise pulse level is comparable to the desired signal pulse level. In a situation of this kind, the presence of a uniformly spaced sequence of output pulses can be detected more reliably than a single pulse. Modifications of the output pulse sense amplifiers 33 of FIGURE 3 to fully utilize the information in the series of output pulses may assume many forms. A preferred form of sense amplifier for multiple-pulse operation is shown in FIGURE 9. The sense wire 39 of FIGURE 3 is connected to input terminal 91 of FIGURE 9. The output pulses of sense wire 39 appearing at terminal 91 are amplified by amplifier 92. The amplified pulses are transferred to counter 95 by wire 97. The counter 95 starts to count pulses on line 97 when it receives a "start-count" pulse at terminal 93. The "start count" pulse may be the same pulse that starts the sequence from generator 32 of FIGURE 3. A "stop-count" pulse at terminal 94 resets counter 95 to zero count after a predetermined number of read pulses have occurred. The counter 95 is designed to give an output indication at terminal 96 when a specified number of pulses on line 97 have been received in the time interval during which the counter is "on."

Figure 10:
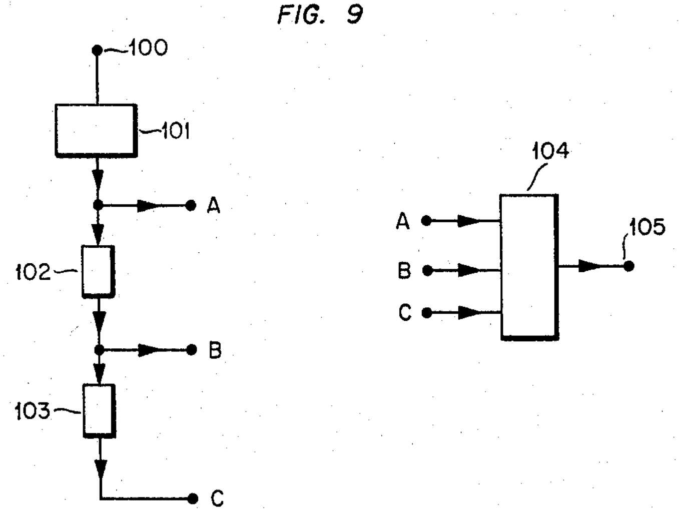
FIGURE 10 is another sensing circuit for multipulse read output operation.

Another form of sense amplifier for multiple pulse operation is shown in FIGURE 10. The pulses on the sense wire 39 of FIGURE 3 are applied to terminal 100 of FIGURE 10. The pulses are amplified in amplifier 101 before transfer to a series connection of delay lines 102, 103. The delay time of delay lines 102, 103 is equal to the time interval between the read current pulses of generator 32 of FIGURE 3. If three consecutive output pulses appear at terminal 100, the action of delay lines 102, 103 will cause the pulses to be coincident in time at terminals A, B, and C. If terminals A, B, and C are connected to corresponding terminals of "and" circuit 104, a pulse will appear at terminal 105. FIGURE 10 may easily be modified so that the presence of only two out of three pulses at terminal 100 will cause an output pulse.

Figure 5:
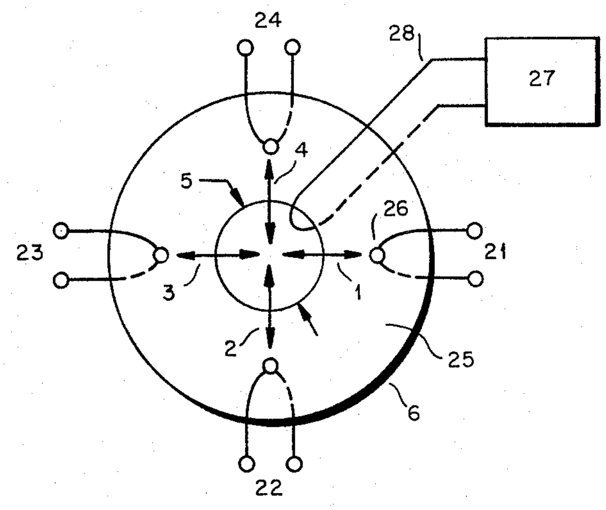
FIGURE 5 illustrates the embodiment which functions as an accumulator of input pulses.

Another embodiment of the invention is shown in FIGURE 5 where the inverse of the multiple read out technique is used to provide a pulse accumulator. Successive applications of impulse currents to a core result in switching larger portions of the core until it reaches saturation. If the output coil of the core is coupled to the input coil by the flux in the core, no output voltage will occur when saturation is reached. Alternatively, this write technique can be used on a core which has a series of radially spaced, circumferentially distributed small sense holes. The presence of an output from a wire threading a particular sense hole indicates that a certain minimum number of write pulses has been received. FIGURE 5 shows a core configuration which illustrates the multiple sense hold technique.

Typically, the ferrite core 25 has an inside diameter 55 of 30 mils, an outside diameter 56 of 215 mils, and a sense hole 26 diameter of 5 mils. Four sense holes 26 are at radial distances 51, 52, 53, and 54 of 32, 49, 70 and 88 mils respectively. Output sense windings 21, 22, 23, 24 thread each of the four sense holes. The input impulse currents are provided by generator 27 to input winding 28.

In accordance with this invention, a pulse current of the proper magnitude and duration on winding 28 will cause an output in winding 21 but substantially no output in windings 22, 23 and 24. A second pulse will produce an output in windings 21 and 22 but substantially no output in windings 23 and 24. This process will continue until saturation causes all windings to have substantially no output. The core must be reset periodically by a reverse current in winding 28 if continuous operation is desired.

Figure 11:
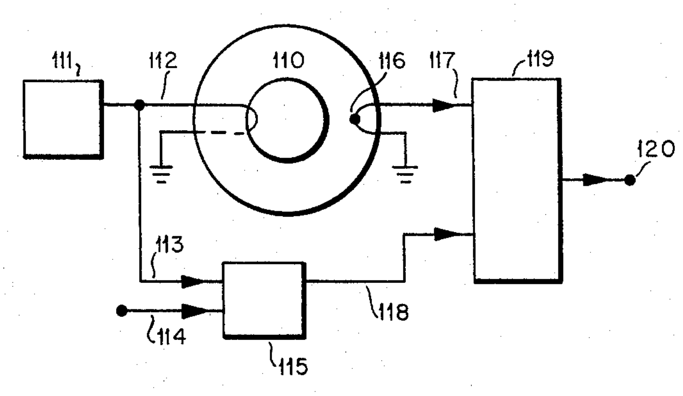
FIGURE 11 is an embodiment of an input pulse current monitor.

One application where an accumulator of this type is needed is to perform the function of a pulse amplitude and duration monitor. Since proper operation of many magnetic core circuits is dependent in a great number of instances on closely controlled drive pulse amplitude and duration, a device which will automatically monitor the drive pulse is desirable. The device of FIGURE 11 can be used as a monitor if the output of winding 117 is time coincidence compared in an "and" circuit 119 with a predetermined one of the successive drive pulses occurring subsequent to a reset pulse. The pulse to be compared in "and" circuit 119 is obtained by counting the drive pulses appearing on line 113 in counter 115 which produces a pulse on line 118 at a predetermined count. The counter is reset to zero by a pulse on line 114 prior to a reset current in winding 112 being applied to core 110. If the drive pulse from generator 111 is of the proper amplitude and duration, a voltage output should exist on winding 117 in time coincidence with a pulse on counter output wire 118. If there is coincidence, a coincidence circuit (an "and" circuit) 119 output pulse at terminal 120 would signify that the drive pulse current is proper. Locating the output winding sense hold 116 a distance from the edge of the core slightly less than the radial distance traversed by the flux per drive pulse has several advantages. The first is that any deviation of the drive pulse from normal is effectively amplified by the summation process produced by the number of pulses required for flux to reach the output winding. Another advantage is that core saturation would occur after an output pulse on winding 117, and hence only one pulse would come from the output winding. Thus the comparator would be capable of detecting drive pulse deviations whether they be greater or lesser in amplitude and duration than the desired drive pulse.

The use of the magnetic circuit of FIGURE 5 as a counter circuit for pulse currents of fixed amplitude and duration is apparent. Winding 21 would produce a voltage for the first and subsequent pulses. Winding 22 would produce a voltage for the second and subsequent pulses, and so on. The pulse count would be determined by the radial position of the last winding to produce an output voltage.

It is to be understood that the size of the magnetic core 25 and other dimensions of FIGURE 5 are for purposes of illustration. The maximum number of sense holes 26 is limited by the minimum diameter of the sense holes, the core size and the minimum radial flux traversal per drive pulse which will give sufficient resolution between output pulses of radially adjacent sense windings.

Figure 7:
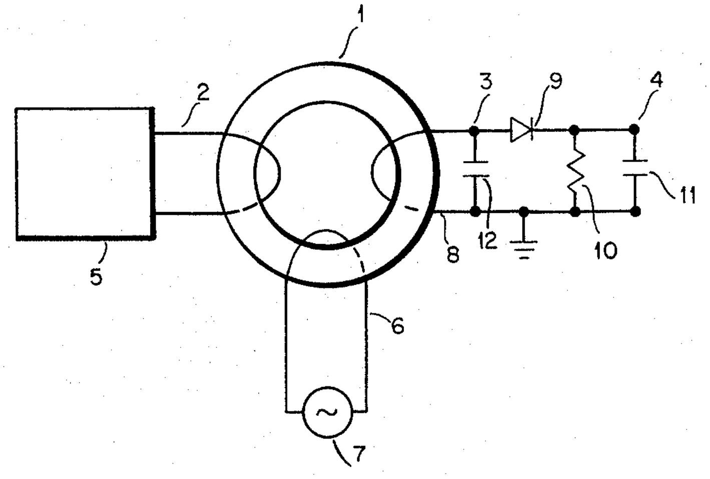
FIGURE 7 is a simple nondestructive read out circuit.

Another embodiment of the present invention, FIGURE 7, is a non-destructive read out circuit which uses the special magnetic properties obtained by partially switching a core by a current pulse of large amplitude and short time duration. If a high frequency sine wave of current is applied to a winding of a core which has been partially switched by an impulse current, the output of a second winding on this partially switched core will be much larger than the output when the core is saturated. The ratio may be in the order of fifteen to one if stray coupling between input and output windings is minimized. However, it is found that if instead the core is partially switched to the same extent by a direct or relatively slowly varying current, the output voltage with the same sine wave excitation is not as large as when the partial switching is produced by an impulse of current. It is believed that the high pulse current nucleates a greater number of magnetic domains throughout the core than a low current. The nucleated domains are thought to be the medium for the transfer of the sine wave input to the output; the greater the number of nucleated domains, the greater the coupling between input and output windings.

Figure 6:
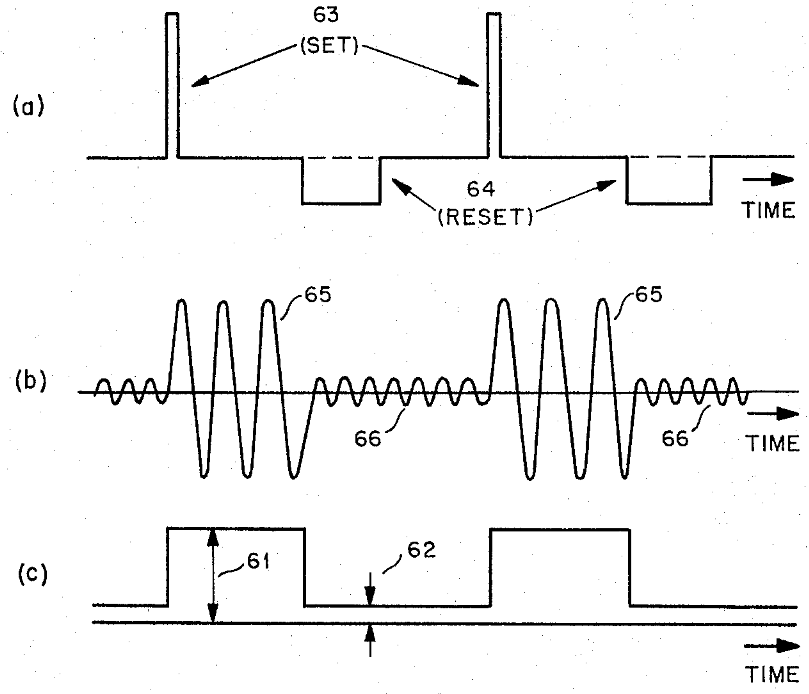
FIGURE 6 shows the waveforms obtained from the nondestructive read out embodiment of the invention.

FIGURE 7 shows one possible embodiment of a sine wave non-destructive read out circuit. Pulse generator 5 produces an impulse current 63 of FIGURE 6*a* in winding 2 which effects a flux change in a portion of magnetic core 1. A sine wave current generator 7 applies an alternating magnetic field to core 1 by an alternating current in winding 6. Since the core 1 has been partially switched by the current 63, a sine wave voltage of relatively large amplitude 65 of FIGURE 6*b* will occur at terminal point 3 of output winding 8. Rectification of the sine wave at point 3 by diode 9 produces a direct voltage 61 of FIG- URE 6$c$ across the parallel resistor 10 capacitor 11 combination at terminal point 4. If a current 64 of FIGURE 6$a$ of amplitude and duration sufficient to produce saturation is subsequently produced in winding 2 by generator 5, a sine wave voltage 66 of FIGURE 6$b$ of relatively small amplitude will occur at terminal point 3. The direct voltage 62 of FIGURE 6$c$ at terminal 4 is considerably smaller than the voltage 61. The different values of the voltages 61 and 62 indicate the magnetic state of the core. A partially switched core may arbitrarily be said to represent a binary "1" and a core in the saturated state a "0." Thus, a high level direct voltage 61 would indicate the presence of a "1," and the low level direct voltage 62 a "0." Although not shown in FIGURE 7, voltage level sensitive apparatus, such as a pulsed "gate," connected to terminal 4 could transform the large direct voltage 61 into a pulse for transmission to other circuitry whereas the small direct voltage 62 would not cause a pulse to be generated. The capacitor 12 when properly adjusted causes the sine wave voltage 65, 66 at terminal 3 to peak, probably because of a resonance with winding 8.

Typical values of a non-destructive read out circuit such as shown in FIGURE 7 are a 50 mil inside diameter, 80 mil outside diameter ferrite core 1; capacitor 12, 200 to 500 $\mu\mu$fd. adjusted for optimum voltage at terminal 3; capacitor 11, 920 $\mu\mu$fd.; alternating current ampere turns on winding 6, 700 ampere turns; winding 8, 15 turns; current 64, 1 ampere turn at 1.0 $\mu$sec. width; current 63, 1 ampere turn at 0.2 $\mu$sec. width; frequency of sine wave current source 7, 10 mc.

The utilization of the circuit of FIGURE 7 as a flip-flop (multivibrator) device is apparent from the fact that it has two stable states either of which can be selected by a current pulse 63 or 64 applied thereto. This particular flip-flop would have the advantage that the sine wave driving power need not be applied continuously in order to retain the magnetic state stored in the core.

Figure 8:
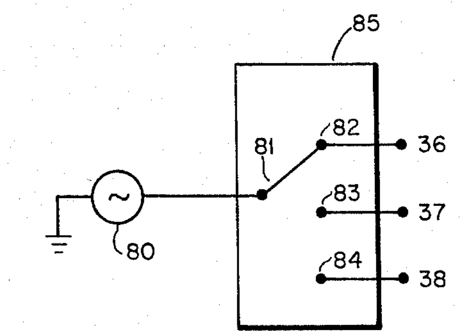
FIGURE 8 illustrates an embodiment which adapts nondestructive read out to a linear selection system such as shown in FIGURE 3.

FIGURE 8 shows in simple form a circuit arrangement which adapts the previously described linear selection memory system of FIGURE 3 to have an non-destructive read type of memory. The read current pulse on the Y drive wires of FIGURE 3 would be used to clear out information stored in any particular word when non-destructive read out is used instead of providing a destructive read out pulse. The terminals 36, 37, 38 of FIGURE 8 are connected to the corresponding terminals of FIGURE 3. A read out selection matrix 85 would determine which of terminals 36, 37 or 38 would be energized with the sine wave current source 80. For purposes of illustration, a terminal selection switch 81 is used to perform the function of the matrix 85. If the switch 81 is at position 82, the information stored in the cores of FIGURE 3 threaded by wire $Y_1$ will appear as sine wave voltages on wires 39, 40 and 41. Detectors 33 of FIGURE 3 no longer are pulse amplifiers as when destructive read out was employed but rather consist of the elements 9, 10, 11 and 12 of FIGURE 7 supplemented by "gate" circuitry if pulse outputs are desired from dectors 33.

While there have been shown and described the fundamental novel features of the invention as applied to preferred embodiments, it will be undestood that various omissions, substitutions, and changes in the forms and details of the devices illustrated and in its operation may be made by those skilled in the art without departing from the spirit of the invention.

What is claimed is:

1. A magnetic core storage element comprising a magnetic core having square loop hysteresis properties, a first means for applying to said core a first magnetizing force insufficient to switch said core, a second means for applying to said core a second magnetizing force sufficient to switch said core, means for producing time coincidence of said first and second magnetizing forces, said second magnetizing force duration being shorter than the time required for said first and second time coincident forces to completely switch the flux in said core, said coincidence of said magnetizing forces produces a change in flux in said core of greater magnitude than that produced by said second force acting alone.

2. A magnetic core storage element comprising a magnetic core having square loop hysteresis properties, a first means for applying to said core a first magnetizing force insufficient to cause flux switching in said core, a second means for applying to said core a second magnetizing force sufficient to cause flux switching in said core, means for selectively producing time coincidence of said first and second magnetizing forces, said second magnetizing force being of shorter time duration than the time required for said second force to completely switch the flux in said core, said coincidence of the magnetizing forces produces a change in flux in said core of greater magnitude than that produced by said second force acting alone.

3. A magnetic information storage circuit comprising a magnetic core having square loop hysteresis properties, a timing pulse generator, a first current pulse generator responsive to the output of said timing pulse generator to provide an output pulse, a second current pulse generator responsive to the output of said timing pulse generator to provide an output pulse in time coincidence with the output of said first current pulse generator and having a longer time duration, a first winding on said core responsive to said first current generator output pulse to apply a magnetizing force substantially greater than the ing magnetizing force required for completely switching the direction of remanent flux in said core, a second winding on said core responsive to said second current generator output pulse to apply a magnetizing force substantially half of the magnetizing force required for completely switching the direction of remanent flux in said core, said first current pulse having a time duration for the magnitude of magnetic flux induced thereby to initiate permanent flux reversal in said core when acting alone, and time coincidence of said first and second current pulses in said first and second windings producing aiding magnetizing forces resulting in flux reversal in a substantial volume of said core.

4. A magnetic information storage circuit comprising a magnetic core having square loop hysteresis properties, a timing pulse generator, a first current pulse generator responsive to the output of said timing pulse generator to provide an output pulse, a second current pulse generator responsive to the output of said timing pulse generator to provide an output pulse in time coincidence with the output of said first current pulse generator and having a longer time duration, a first winding on said core responsive to said first current generator output pulse to apply a magnetizing force substantially greater than the magnetizing force required for completely switching the direction of remanent flux in said core, a second winding on said core responsive to said second current generator output pulse to apply a magnetizing force substantially half of the magnetizing force required for completely switching the direction of remanent flux in said core, said first current pulse having a time duration too short for the magnitude of magnetic flux induced thereby to cause complete flux reversal in said core when acting alone, and time coincidence of said first and second current pulses in said first and second windings being required for producing a third magnetizing force resulting in flux reversal in a substantially different volume of said core than is produced by said first current pulse when acting alone.

5. A magnetic information storage circuit comprising, a magnetic core having square loop hysteresis properties, a first current pulse generator adapted to produce a short time duration high amplitude pulse of current, a second pulse generator adapted to produce a low amplitude longer lasting pulse of current, a first winding on said core energized by the output of said first pulse generator to apply a magnetizing force greater than the magnetic force required for complete flux reversal in said core, the time duration of application of said magnetizing force being less than the time required for complete flux reversal in said core but sufficient for partial flux reversal, a second winding on said core energized by the output of said second pulse generator to apply a magnetizing force of insufficient magnitude to cause flux reversal in said core, a timing pulse generator adapted to time the operation of said first and second pulse generators to provide for selected time coincident application of said first and second current pulses resulting in flux reversal in a substantial volume of said core.

References Cited by the Examiner

UNITED STATES PATENTS

| | | | |
|---|---|---|---|
| 2,777,098 | 1/1957 | Duffing | 340—174 X |
| 3,007,142 | 10/1961 | An Wang | 340—174 |
| 3,027,547 | 3/1962 | Froelich | 340—174 |

BERNARD KONICK, *Primary Examiner.*

IRVING SRAGOW, *Examiner.*

H. D. VOLK, R. J. McCLOSKEY, *Assistant Examiners.*

UNITED STATES PATENT OFFICE

CERTIFICATE OF CORRECTION

Patent No. 3,281,802 October 25, 1966

Robert E. McMahon

It is hereby certified that error appears in the above numbered patent requiring correction and that the said Letters Patent should read as corrected below.

In the drawings, Sheet 1, in FIG. 1 a block labeled "Timing Pulse Generator" has a reference numbered 42 and is connected with its output conductor connected to block 16 and the same output conductor connected to block 14; Sheet 2, in FIG. 3 a block labeled "Timing Pulse Generator" has a reference numeral 42 and is connected with its output conductor connected to block 34 and the same output conductor connected to block 35.

Signed and sealed this 22nd day of October 1968.

(SEAL)

Attest:

Edward M. Fletcher, Jr.
Attesting Officer

EDWARD J. BRENNER
Commissioner of Patents